United States Patent
Han et al.

(10) Patent No.: US 9,733,711 B2
(45) Date of Patent: Aug. 15, 2017

(54) SENSING MODULE, AND GRAPHICAL USER INTERFACE (GUI) CONTROL APPARATUS AND METHOD

(75) Inventors: Jae Joon Han, Seoul (KR); Byung In Yoo, Seoul (KR); Chang Kyu Choi, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 425 days.

(21) Appl. No.: 13/352,839

(22) Filed: Jan. 18, 2012

(65) Prior Publication Data

US 2012/0182215 A1    Jul. 19, 2012

(30) Foreign Application Priority Data

Jan. 18, 2011 (KR) .................. 10-2011-0005033

(51) Int. Cl.
*G06F 3/02* (2006.01)
*G06F 3/042* (2006.01)
(Continued)

(52) U.S. Cl.
CPC .......... *G06F 3/017* (2013.01); *G06F 3/0202* (2013.01); *G06F 3/0213* (2013.01); *G06F 3/0304* (2013.01); *G06F 3/0308* (2013.01); *G06F 3/03543* (2013.01); *G06F 3/042* (2013.01); *G06F 3/0421* (2013.01); *G06F 3/0489* (2013.01); *H01H 2219/0621* (2013.01)

(58) Field of Classification Search
CPC .... G06F 3/0213; G06F 3/0304; G06F 3/0421; G06F 2203/04109; G06F 3/0308; G06F 3/0238; G06F 3/0231; G06F 1/1669; G06F 3/03543; G06F 3/042; G06F 3/0489; G05G 2009/04759; H03K 17/969; H03K 17/9629; H01H 2219/0621
USPC .................. 345/158, 166, 170, 175, 168
See application file for complete search history.

(56) References Cited

U.S. PATENT DOCUMENTS

| | | | | |
|---|---|---|---|---|
| 4,254,333 A | * | 3/1981 | Bergstrom | G01V 8/14 250/221 |
| 4,379,968 A | * | 4/1983 | Ely | H03K 17/969 250/229 |

(Continued)

FOREIGN PATENT DOCUMENTS

| | | |
|---|---|---|
| JP | 2003-122477 | 4/2003 |
| KR | 10-2005-0092549 | 9/2005 |

(Continued)

OTHER PUBLICATIONS

NUI Group Community Forums, Getting Started With MultiTouch, Published Aug. 6, 2009; see p. 4, Diffused Surface Illumination (DSI).*

(Continued)

*Primary Examiner* — Michael J Eurice
(74) *Attorney, Agent, or Firm* — NSIP Law

(57) ABSTRACT

A sensing module, and a Graphical User Interface (GUI) control apparatus and method are provided. The sensing module may be inserted into an input device, for example a keyboard, a mouse, a remote controller, and the like, and may sense a hovering movement of a hand of a user within a sensing area, and thus it is possible to provide an interface to control a wider variety of GUIs, and possible to prevent a display from being covered.

17 Claims, 15 Drawing Sheets

(51) Int. Cl.
  *G06F 3/01*      (2006.01)
  *G06F 3/03*      (2006.01)
  *G06F 3/0354*    (2013.01)
  *G06F 3/0489*    (2013.01)

(56) References Cited

U.S. PATENT DOCUMENTS

| | | | | |
|---|---|---|---|---|
| 4,417,824 A * | 11/1983 | Paterson | H03K 17/969 | 178/17 C |
| 4,641,026 A * | 2/1987 | Garcia, Jr. | G06F 3/0202 | 250/229 |
| 4,701,747 A * | 10/1987 | Isherwood | H03K 17/9629 | 250/221 |
| 4,814,600 A * | 3/1989 | Bergstrom | H03K 17/9638 | 250/221 |
| 4,931,794 A * | 6/1990 | Haag | H03K 17/969 | 200/5 A |
| 5,286,125 A * | 2/1994 | DiGiosia | B41J 5/10 | 400/472 |
| 5,341,133 A * | 8/1994 | Savoy et al. | | 341/22 |
| 5,369,262 A * | 11/1994 | Dvorkis | G06F 3/03543 | 235/440 |
| 5,410,150 A * | 4/1995 | Teron | G05D 23/1905 | 250/227.22 |
| 5,477,223 A * | 12/1995 | Destremps | B41J 5/12 | 250/221 |
| 5,515,045 A * | 5/1996 | Tak | G06F 3/0202 | 341/22 |
| 5,943,233 A * | 8/1999 | Ebina | G06F 3/0304 | 250/221 |
| 5,963,434 A * | 10/1999 | Jonsson | G02F 1/133615 | 174/250 |
| 5,994,710 A * | 11/1999 | Knee | G06F 3/0317 | 250/208.1 |
| 6,026,283 A * | 2/2000 | Stephenson | H04M 1/22 | 379/433.07 |
| 6,300,940 B1 * | 10/2001 | Ebina | G06F 3/0304 | 345/160 |
| 6,496,180 B1 * | 12/2002 | Hedman | G06F 3/03543 | 345/163 |
| 6,525,677 B1 * | 2/2003 | Printzis | H03K 17/943 | 178/18.09 |
| 6,552,713 B1 * | 4/2003 | Van Brocklin | G06F 1/1616 | 345/156 |
| 7,489,306 B2 | 2/2009 | Kolmykov-Zotov et al. | | |
| 7,573,463 B2 | 8/2009 | Liess | | |
| 8,786,548 B2 * | 7/2014 | Oh et al. | | 345/160 |
| 2002/0035701 A1 * | 3/2002 | Casebolt | G06F 1/3203 | 713/300 |
| 2002/0093481 A1 * | 7/2002 | Kehlstadt | G06F 1/3203 | 345/156 |
| 2002/0171633 A1 * | 11/2002 | Brinjes | | 345/168 |
| 2003/0025082 A1 * | 2/2003 | Brewington | G08B 13/181 | 250/341.8 |
| 2003/0025679 A1 * | 2/2003 | Taylor | G06F 3/0414 | 345/175 |
| 2003/0034439 A1 * | 2/2003 | Reime | G06F 3/03547 | 250/221 |
| 2003/0038824 A1 * | 2/2003 | Ryder | G06F 3/0421 | 345/684 |
| 2003/0063775 A1 * | 4/2003 | Rafii et al. | | 382/106 |
| 2003/0076303 A1 * | 4/2003 | Huppi | G06F 3/03543 | 345/163 |
| 2003/0117370 A1 * | 6/2003 | Van Brocklin et al. | | 345/156 |
| 2004/0046741 A1 * | 3/2004 | Low | G06F 3/0317 | 345/166 |
| 2004/0046744 A1 * | 3/2004 | Rafii et al. | | 345/168 |
| 2004/0095323 A1 * | 5/2004 | Ahn | G06F 3/0317 | 345/166 |
| 2004/0104894 A1 * | 6/2004 | Tsukada et al. | | 345/168 |
| 2004/0174339 A1 * | 9/2004 | Liao | H01H 3/125 | 345/167 |
| 2005/0018172 A1 * | 1/2005 | Gelfond | G06F 3/0489 | 356/51 |
| 2005/0068300 A1 * | 3/2005 | Wang | G06F 3/0317 | 345/166 |
| 2005/0092843 A1 * | 5/2005 | Dowling et al. | | 235/472.01 |
| 2005/0156875 A1 * | 7/2005 | Kong | G06F 3/03543 | 345/156 |
| 2005/0157202 A1 * | 7/2005 | Lin | H04N 5/2353 | 348/362 |
| 2005/0162389 A1 * | 7/2005 | Obermeyer | G05G 9/047 | 345/161 |
| 2005/0231484 A1 * | 10/2005 | Gordon | G06F 3/0317 | 345/166 |
| 2006/0050062 A1 * | 3/2006 | Ozawa | G06F 1/1616 | 345/173 |
| 2006/0066576 A1 * | 3/2006 | Kong | G06F 3/0202 | 345/168 |
| 2006/0066589 A1 * | 3/2006 | Ozawa | G06F 3/0414 | 345/173 |
| 2006/0066590 A1 * | 3/2006 | Ozawa | G06F 3/04886 | 345/173 |
| 2006/0082548 A1 * | 4/2006 | Kodama | G06F 3/0213 | 345/157 |
| 2006/0152494 A1 * | 7/2006 | Liess | G06F 1/1616 | 345/169 |
| 2006/0203485 A1 * | 9/2006 | Fu | H01H 13/83 | 362/237 |
| 2006/0256090 A1 * | 11/2006 | Huppi | A63F 13/02 | 345/173 |
| 2006/0284743 A1 * | 12/2006 | Kong | H03K 17/969 | 341/31 |
| 2007/0018970 A1 * | 1/2007 | Tabasso | G06F 1/3203 | 345/184 |
| 2007/0062793 A1 * | 3/2007 | Hung | H01H 13/83 | 200/310 |
| 2007/0200970 A1 * | 8/2007 | Keam | G06F 3/0421 | 349/58 |
| 2007/0296701 A1 * | 12/2007 | Pope | G06F 1/3215 | 345/168 |
| 2008/0006516 A1 * | 1/2008 | Nishino | H01H 3/122 | 200/345 |
| 2008/0018591 A1 * | 1/2008 | Pittel et al. | | 345/156 |
| 2008/0042980 A1 * | 2/2008 | Bowen | G06F 3/0234 | 345/168 |
| 2008/0055494 A1 * | 3/2008 | Cernasov | G02F 1/13338 | 349/12 |
| 2008/0055495 A1 * | 3/2008 | Cernasov | G02F 1/13338 | 349/12 |
| 2008/0062015 A1 * | 3/2008 | Bowen | G06F 3/0234 | 341/22 |
| 2008/0122796 A1 * | 5/2008 | Jobs | G06F 3/0488 | 345/173 |
| 2008/0141847 A1 * | 6/2008 | Komatsu | G10H 1/346 | 84/440 |
| 2008/0143560 A1 * | 6/2008 | Shipman | G06F 3/0202 | 341/22 |
| 2008/0180654 A1 * | 7/2008 | Bathiche et al. | | 356/51 |
| 2008/0186736 A1 * | 8/2008 | Rinko | G02B 6/0036 | 362/615 |
| 2008/0218769 A1 * | 9/2008 | Ahn | G06F 3/03547 | 356/614 |
| 2008/0231596 A1 | 9/2008 | Liu et al. | | |
| 2008/0246606 A1 * | 10/2008 | Smith | G09G 3/3208 | 340/540 |
| 2008/0284734 A1 * | 11/2008 | Visser | G06F 3/023 | 345/166 |
| 2009/0179869 A1 * | 7/2009 | Slotznick | | 345/173 |
| 2009/0201179 A1 * | 8/2009 | Shipman | G06F 3/0202 | 341/22 |
| 2009/0219253 A1 * | 9/2009 | Izadi et al. | | 345/173 |
| 2009/0245574 A1 * | 10/2009 | Ahn | G06F 3/03547 | 382/103 |
| 2010/0059354 A1 * | 3/2010 | Hsu | H01H 13/704 | 200/5 A |
| 2010/0079419 A1 * | 4/2010 | Shibusawa | H01L 27/3272 | 345/204 |

(56) References Cited

U.S. PATENT DOCUMENTS

| | | | | |
|---|---|---|---|---|
| 2010/0148996 | A1* | 6/2010 | Wang | H01H 13/83 341/22 |
| 2010/0149099 | A1* | 6/2010 | Elias | G06F 1/1616 345/168 |
| 2010/0214135 | A1* | 8/2010 | Bathiche et al. | 341/23 |
| 2010/0225588 | A1* | 9/2010 | Newton | G06F 3/017 345/168 |
| 2010/0294938 | A1* | 11/2010 | Alameh | G06F 3/0308 250/342 |
| 2010/0295772 | A1* | 11/2010 | Alameh | G06F 3/017 345/156 |
| 2010/0295773 | A1* | 11/2010 | Alameh | H03K 17/9631 345/156 |
| 2011/0032185 | A1* | 2/2011 | Yamamoto | G06F 3/0346 345/157 |
| 2011/0038115 | A1* | 2/2011 | Halkosaari | H01H 13/83 361/679.08 |
| 2011/0169743 | A1* | 7/2011 | Oh | H04M 1/22 345/169 |

FOREIGN PATENT DOCUMENTS

| | | |
|---|---|---|
| KR | 10-2006-0035925 | 4/2006 |
| KR | 10-2008-0057270 A | 6/2008 |
| KR | 10-2008-0098374 A | 11/2008 |

OTHER PUBLICATIONS

NUI Group Community Forums, Getting Started With MultiTouch, Published at least as early as Aug. 6, 2009; see p. 4, Diffused Surface Illumination (DSI).*

Korean Office Action issued June 21, 2017, in corresponding Korean Application No. 10-2011-0005033 (8 pages in English, 7 pages in Korean).

* cited by examiner

200

210

SENSING MODULE, AND GRAPHICAL USER INTERFACE (GUI) CONTROL APPARATUS AND METHOD

CROSS-REFERENCE TO RELATED APPLICATIONS

This application claims the benefit of Korean Patent Application No. 10-2011-0005033, filed on Jan. 18, 2011, in the Korean Intellectual Property Office, the disclosure of which is incorporated herein by reference.

BACKGROUND

1. Field

Example embodiments of the following description relate to a sensing module, and a Graphical User Interface (GUI) control apparatus and method, and more particularly, to an apparatus and method for controlling a GUI based on information detected by a sensing module.

2. Description of the Related Art

Natural interface technologies for strengthening natural interaction between humans and computers are emerging. In particular, researches have been conducted on recognition of intentions and actions of users for interaction between humans and computers based on multi-touching and hovering.

Conventionally, information on a position of a plane of a display, or a plane of a touch panel, and whether the plane of the display or the plane of the touch panel is touched, are used as signals for a User Interface (UI).

Recently, with the advent of a scheme enabling sensing of a short distance, a display or a touch panel that enables sensing of a short distance, are being designed. Accordingly, a plane position, and depth information between a panel and a touched object may be recognized, and may be used as an input of a UI.

However, conventionally, a problem may occur that an image displayed on a display is covered by hovering performed by hands or fingers above the display.

SUMMARY

The foregoing and/or other aspects are achieved by providing a sensing module for sensing a hovering movement of a hand of a user within a sensing area located in a side of an input device, the sensing module including a light emitter to emit light, and a light sensor to sense reflected light, and to collect movement information regarding the hovering movement of the hand, the reflected light being generated when the emitted light is reflected from the hand.

The foregoing and/or other aspects are achieved by providing an apparatus for controlling a Graphical User Interface (GUI), the apparatus including a receiver to receive, from an input device, movement information regarding a hovering movement of a hand of a user within a sensing area located in a side of the input device, a generator to generate GUI control information based on the movement information, and a controller to control a GUI based on the GUI control information.

The foregoing and/or other aspects are also achieved by providing a method of controlling a GUI, the method including receiving, from an input device, movement information regarding a hovering movement of a hand of a user within a sensing area located in a side of the input device, generating GUI control information based on the movement information, and controlling a GUI based on the GUI control information.

Additional aspects, features, and/or advantages of example embodiments will be set forth in part in the description which follows and, in part, will be apparent from the description, or may be learned by practice of the disclosure.

BRIEF DESCRIPTION OF THE DRAWINGS

These and/or other aspects and advantages will become apparent and more readily appreciated from the following description of the example embodiments, taken in conjunction with the accompanying drawings of which.

DETAILED DESCRIPTION

Figure 1:
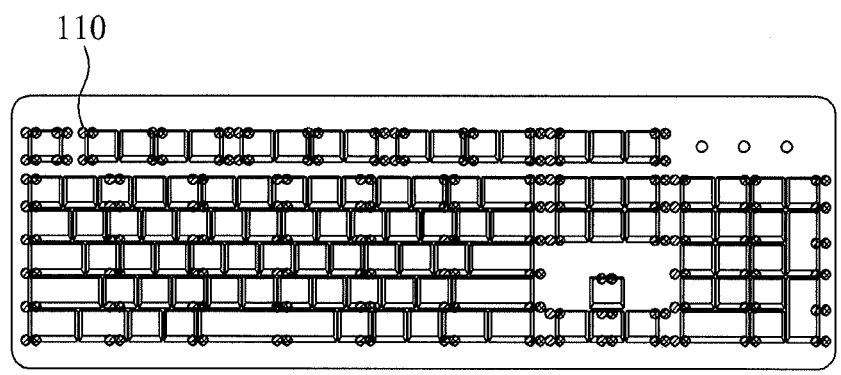
FIG. 1 illustrates a diagram of a hovering keyboard equipped with a sensing module according to example embodiments.

Reference will now be made in detail to example embodiments, examples of which are illustrated in the accompanying drawings, wherein like reference numerals refer to the like elements throughout. Example embodiments are described below to explain the present disclosure by referring to the figures.

FIG. 1 illustrates a diagram of a hovering keyboard 100 equipped with a sensing module according to example embodiments.

Referring to FIG. 1, the sensing module in the hovering keyboard 100 may sense a hovering movement of a hand of a user within a sensing area. The sensing area may have a predetermined size, and may be located above the hovering keyboard 100.

For example, the sensing module may be located in a point 110 of the hovering keyboard 100. A plurality of points may be included in the hovering keyboard 100.

Accordingly, a user of the hovering keyboard 100 may input an input signal by manually operating keys on the hovering keyboard 100, or by moving or rotating the hand of the user within the sensing area above the hovering keyboard 100.

Figure 2:
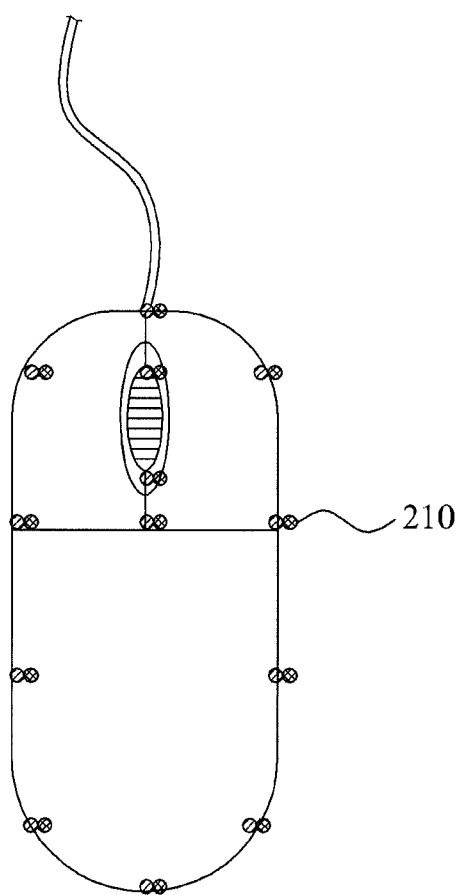
FIG. 2 illustrates a diagram of a hovering mouse equipped with a sensing module according to example embodiments.

FIG. 2 illustrates a diagram of a hovering mouse 200 equipped with a sensing module according to example embodiments.

Referring to FIG. 2, the sensing module in the hovering mouse 200 may sense a hovering movement of a hand of a user within a sensing area. The sensing area may have a predetermined size, and may be located above the hovering mouse 200.

For example, the sensing module may be located in a point 210 of the hovering mouse 200. A plurality of points may be included in the hovering mouse 200.

Accordingly, a user of the hovering mouse 200 may input an input signal by manually operating buttons on the hovering mouse 200, or by moving or rotating the hand of the user within the sensing area on the hovering mouse 200.

FIGS. 3 through 6 illustrate diagrams of structures of sensing modules according to example embodiments.

Figure 3:
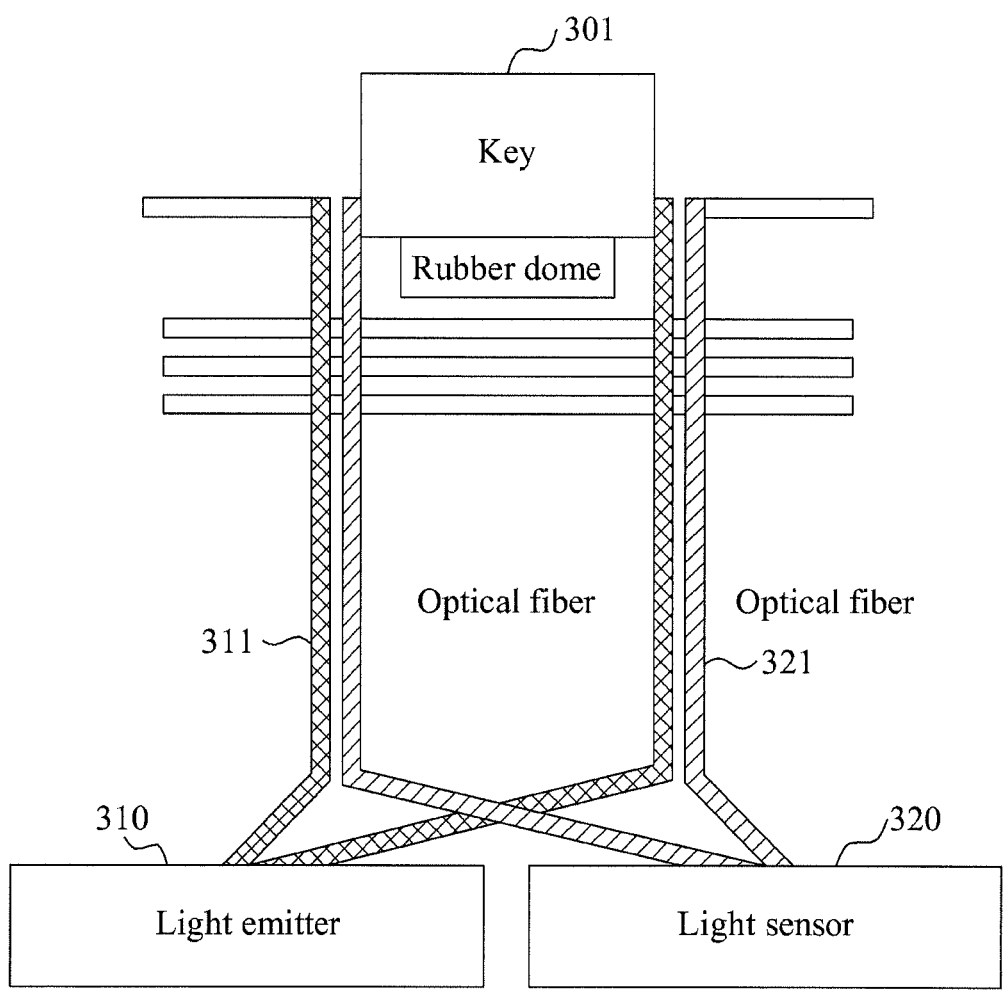
FIGS. 3 through 6 illustrate diagrams of structures of sensing modules according to example embodiments.

Referring to FIG. 3, a sensing module may include a light emitter 310, and a light sensor 320.

The sensing module of FIG. 3 may sense a hovering movement of a hand of a user within a sensing area located in a side of an input device.

The input device may include at least one of the hovering keyboard 100 of FIG. 1, the hovering mouse 200 of FIG. 2, and a remote controller.

The light emitter 310 may emit light.

The light sensor 320 may sense reflected light. The reflected light may be generated when the emitted light is reflected from the hand moving within the sensing area. Additionally, the light sensor 320 may collect movement information regarding the hovering movement of the hand, based on the sensed reflected light.

The sensing area in the side of the input device may be space with a predetermined size, to sense movements of body parts of the user, for example the hands of the user, and movements of tools within the sensing area. Depending on embodiments, a sensing area may be located in a plurality of sides of the input device. Additionally, a plurality of sensing areas may be set in the plurality of sides of the input device, respectively.

For example, the light sensor 320 may collect, from information on the sensed reflected light, information regarding a position of the hand, a size of the hand, a rotation of the hand, a hovering movement of the hand, a movement speed of the hand, and the like.

The sensing module of FIG. 3 may further include a first optical fiber 311, and a second optical fiber 321.

A first side of the first optical fiber 311 may be connected to the light emitter 310, and a second side of the first optical fiber 311 may be exposed outside the input device. The first optical fiber 311 may totally reflect the light emitted from the light emitter 310, so that the emitted light may travel outward from the side of the input device. In other words, the light may be emitted from the light emitter 310 to the side of the input device through the first optical fiber 311.

Depending on embodiments, a plurality of first optical fibers 311 may be included, and may be exposed outside the input device in a plurality of positions that are set in advance in the side of the input device.

A first side of the second optical fiber 321 may be connected to the light sensor 320, and a second side of the second optical fiber 321 may be exposed outside the input device. The second optical fiber 321 may totally reflect, to the light sensor 320, reflected light generated when the light emitted through the first optical fiber 311 exposed outside the input device is reflected from the hand within the sensing area.

Depending on embodiments, a plurality of second optical fibers 321 may be included, and may be exposed outside the input device in a plurality of positions that are set in advance in the side of the input device.

For example, when a keyboard is used as an input device, the first optical fiber 311 and the second optical fiber 321 may be exposed outside the keyboard at a point located in a gap between a key 301 and a neighboring key.

Accordingly, in an input device including a sensing module configured as shown in FIG. 3, the sensing module may include a single light emitter and a single light sensor, and may sense a hovering movement of a hand of a user within a sensing area in the input device, using a plurality of optical fibers.

Figure 4:
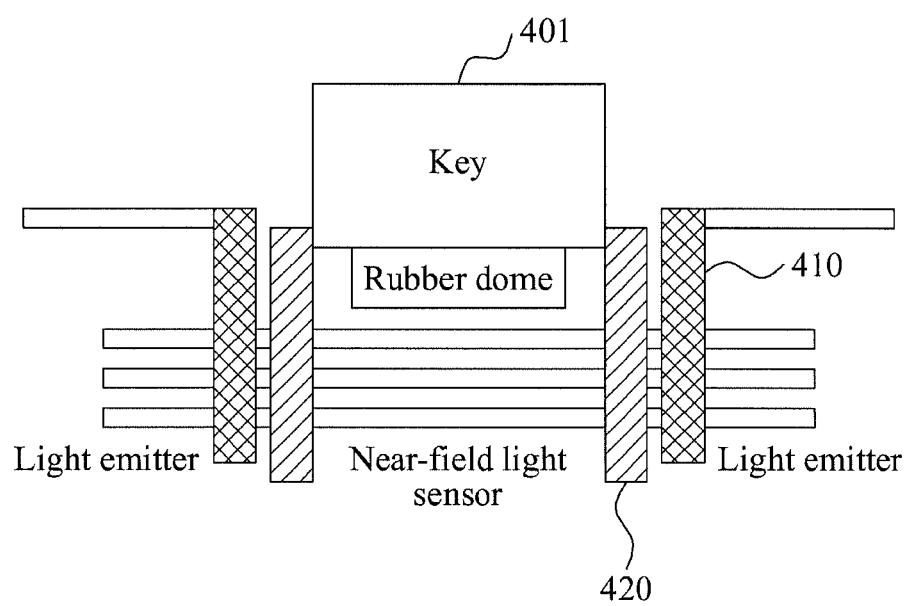

Referring to FIG. 4, a sensing module may include a plurality of light emitters 410, and a plurality of near-field light sensors 420.

The near-field light sensors 420 may be an example of the light sensor 320 of FIG. 3.

The plurality of light emitters 410 may be included in an input device, and may be inserted in a plurality of positions that are set in advance in a side of the input device.

The plurality of near-field light sensors 420 may be included in the input device, and may be inserted in the plurality of positions.

For example, when a keyboard is used as an input device, the plurality of light emitters 410 and the plurality of near-field light sensors 420 may be exposed outside the keyboard at a plurality of points that are located in a gap between a key 401 and a neighboring key.

Accordingly, in an input device including a sensing module configured as shown in FIG. 4, a plurality of light emitters and a plurality of light sensors may be inserted for each of a plurality of points, and thus it is possible to sense a hovering movement of a hand of a user within a sensing area.

Figure 5:
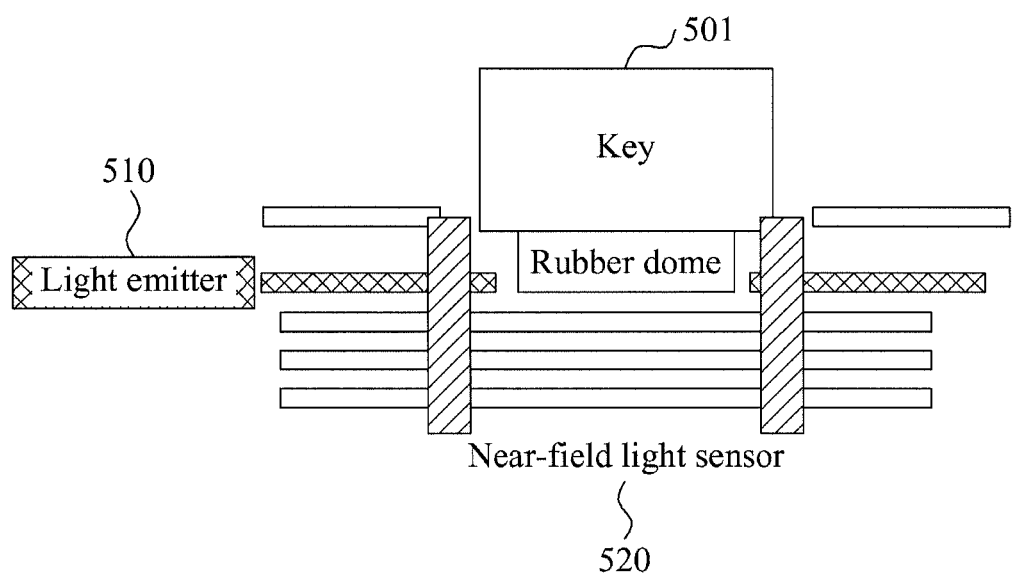

Referring to FIG. 5, a sensing module may include a wedge-type light emitter 510, and a plurality of near-field light sensors 520.

The wedge-shaped light emitter 510 may be inserted into an input device. Additionally, the wedge-shaped light emitter 510 may emit light based on a Diffused Surface Illumination (DSI) scheme.

For example, when a keyboard is used as an input device, the wedge-shaped light emitter 510 may be inserted between rows of a key 501, and may emit light.

In this instance, the plurality of near-field light sensors 520 may be inserted in a plurality of positions that are set in advance in a side of the input device.

Accordingly, in an input device including a sensing module configured as shown in FIG. 5, light may be emitted by a wedge-shaped light emitter, and reflected light may be sensed by a plurality of near-field light sensors for each of a plurality of points, and thus it is possible to sense a hovering movement of a hand of a user within a sensing area.

Figure 6:
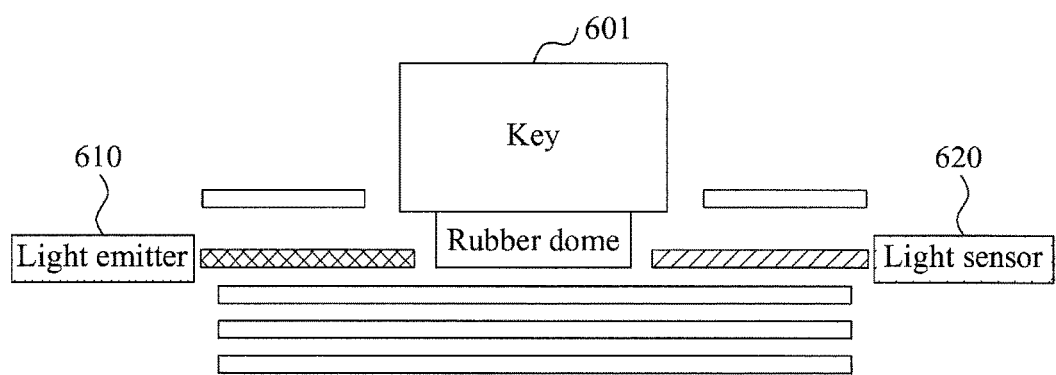

Referring to FIG. 6, a sensing module may include a wedge-shaped light emitter 610, and a wedge-shaped light sensor 620.

The wedge-shaped light emitter 610 may be inserted into an input device. Additionally, the wedge-shaped light emitter 610 may emit light based on a DSI scheme.

The wedge-shaped light sensor 620 may also be inserted into the input device.

For example, when a keyboard is used as an input device, the wedge-shaped light emitter 610 and the wedge-shaped light sensor 620 may be inserted between rows of a key 601, and the wedge-shaped light emitter 610 may emit light.

As described above with reference to FIGS. 1 through 6, a sensing module may sense a hovering movement of a hand of a user within a sensing area, and may transmit information regarding the sensed hovering movement to a Graphical User Interface (GUI) control apparatus. The GUI control apparatus may control a GUI using the received information.

For example, when a user inputs an input signal by moving a hand of the user within a sensing area of an input device, a sensing module may sense a hovering movement of the hand, and may transmit information on the hovering movement to a GUI control apparatus, so that the GUI control apparatus may control a GUI.

Hereinafter, a GUI control apparatus will be further described.

Figure 7:
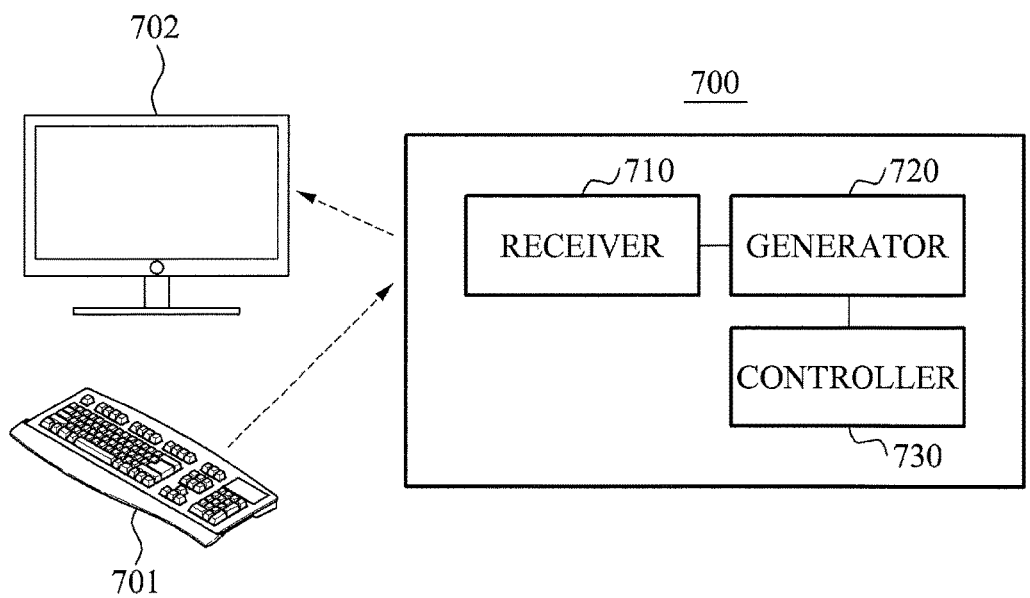
FIG. 7 illustrates a diagram of a configuration of a Graphical User Interface (GUI) control apparatus according to example embodiments.

FIG. 7 illustrates a diagram of a configuration of a GUI control apparatus 700 according to example embodiments.

Referring to FIG. 7, the GUI control apparatus 700 may include a receiver 710, a generator 720, and a controller 730.

An input device 701 including a sensing module may sense a hovering movement of a hand of a user within a sensing area. Additionally, the input device 701 may transmit, to the GUI control apparatus 700, movement information regarding the sensed hovering movement. The sensing area may be located in a side of the input device 701.

More specifically, the input device 701 may include a light emitter (not shown), and a light sensor (not shown). The light emitter may emit light. The light sensor may sense reflected light generated when the emitted light is reflected from the hand within the sensing area, and may collect the movement information.

The receiver 710 may receive the movement information from the input device 701.

The movement information may include at least one of information regarding a position of the hand, a size of the hand, a rotation of the hand, and a movement speed of the hand.

Figure 10:
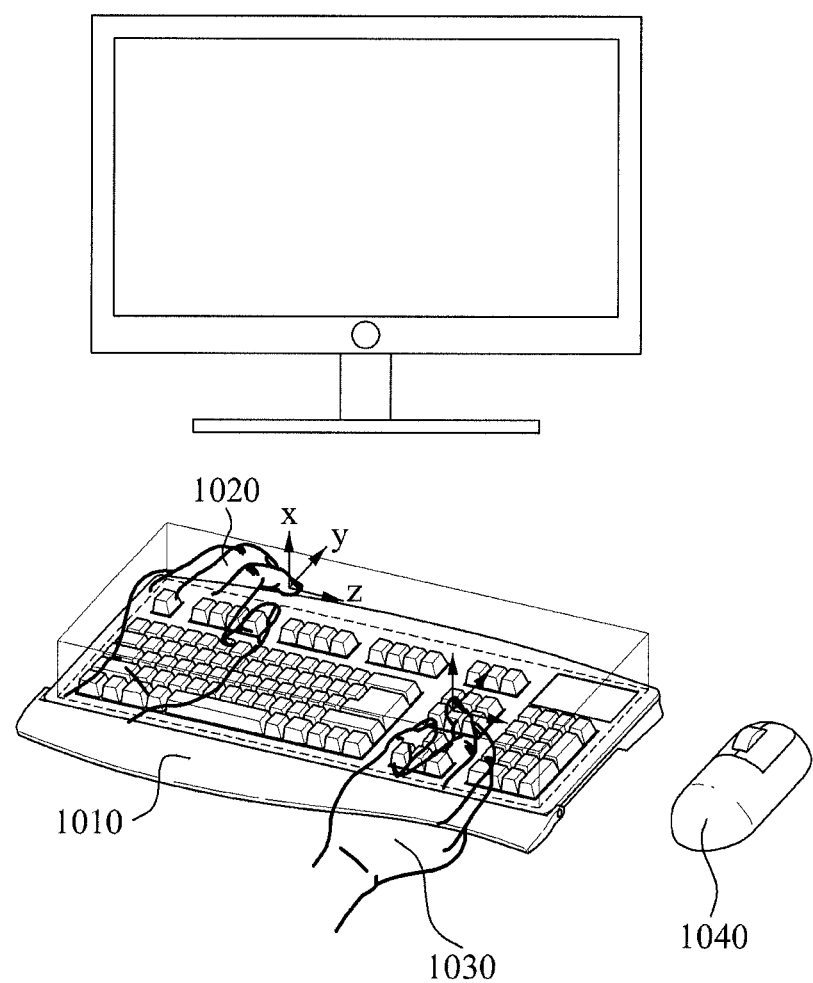

For example, the movement information may include three-dimensional (3D) coordinates (x, y, z) representing the position of the hand within the sensing area shown in FIG. 10, coordinates (rx, ry, rz) representing the rotation of the hand, and the like.

The generator 720 may generate GUI control information based on the movement information.

The generator 720 may generate GUI control information, based on a table in which types of movement of the hand are matched to meaningful control signals.

For example, when a hand of a user moves 5 cm in an x-axis direction, an action of moving an object in the same direction as the hand moves, and the like may be included in the table.

The controller 730 may control a GUI 702, based on the GUI control information.

According to an aspect, a user may input an input signal by moving a hand of the user within a sensing area, or by operating keys or buttons of the input device 701.

In this instance, the input device 701 may transmit, to the GUI control apparatus 700, input information, as well as the movement information. The input information may be inputted to the input device 701 by the user operating the keys or buttons of the input device 701.

The receiver 710 may further receive the input information from the input device 701.

For example, when a keyboard or a mouse is used as the input device 701, input information may include at least one of information on keys on the keyboard entered by the user, information on buttons on the mouse entered by the user, information on a position of the mouse, and information on a wheel value of the mouse.

Additionally, the generator 720 may generate GUI control information, based on the input information, as well as the movement information.

Hereinafter, examples in which a user inputs an input signal to control a GUI using an input device including a sensing module will be described in detail with reference to FIGS. 8 through 15.

FIGS. 8 through 15 illustrate examples in which a user inputs an input signal using an input device including a sensing module according to example embodiments. Hereinafter, a keyboard 810, a mouse 830, or a remote controller (not shown) may be used as an input device including a sensing module (not shown).

Figure 8:
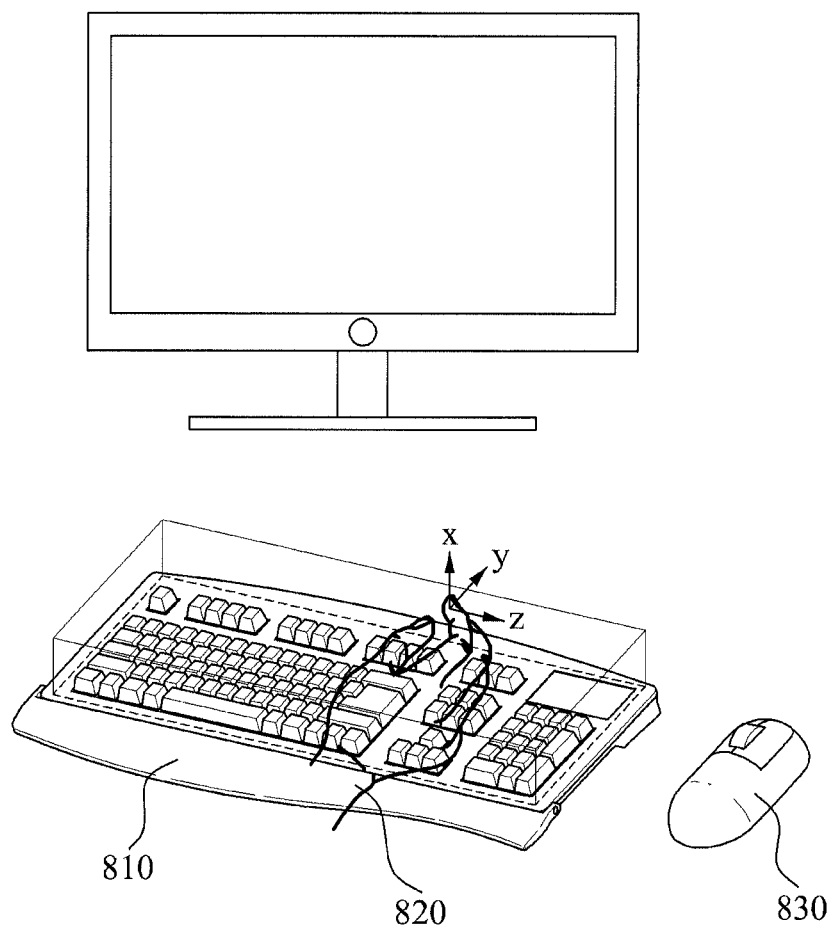
FIGS. 8 through 15 illustrate diagrams of examples in which a user inputs an input signal using an input device including a sensing module according to example embodiments.

Referring to FIG. 8, a user of a GUI control apparatus may input an input signal to control a GUI by moving a single hand 820 of the user within a sensing area. The sensing area may be located in a side of a keyboard 810 including a sensing module (not shown).

The GUI control apparatus may receive, from the keyboard 810, movement information regarding a hovering movement of the hand 820 sensed by the sensing module. Additionally, the GUI control apparatus 700 may generate GUI control information based on the received movement information, and may control the GUI based on the generated GUI control information.

In this instance, the movement information may include coordinates (x, y, z, rx, ry, rz) representing information on a position and rotation of the hand 820 within the sensing area above the keyboard 810.

Figure 9:
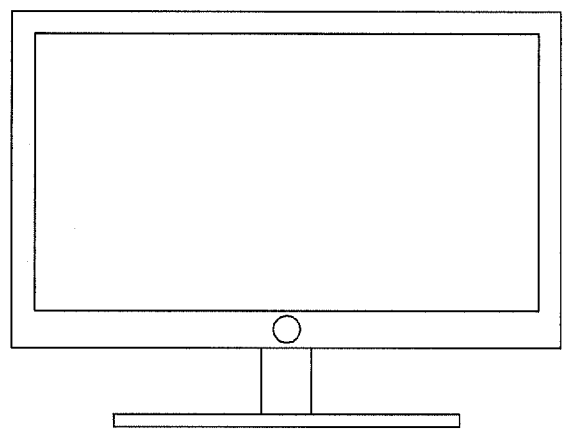
Figure 9:
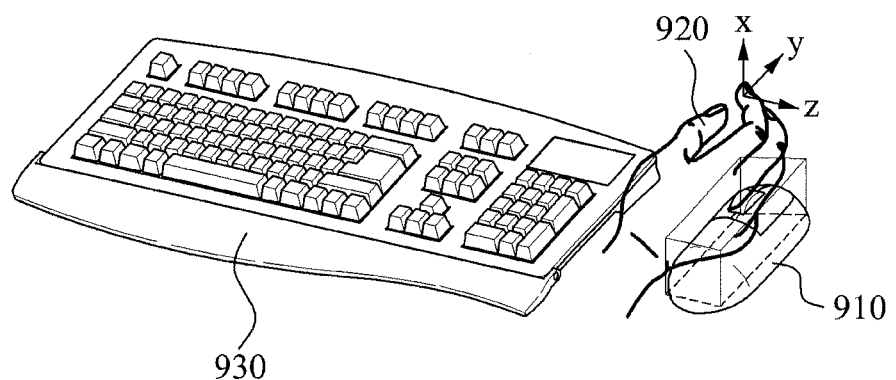

Referring to FIG. 9, a user of a GUI control apparatus may input an input signal to control a GUI by moving a single hand 920 of the user within a sensing area. The sensing area may be located in a side of a mouse 910 including a sensing module.

The GUI control apparatus may receive, from the mouse 910, movement information regarding a hovering movement of the hand 920 sensed by the sensing module. Additionally, the GUI control apparatus may generate GUI control information based on the received movement information, and may control the GUI based on the generated GUI control information.

In this instance, the movement information may include coordinates (x, y, z, rx, ry, rz) representing information on a position and rotation of the hand 920 within the sensing area above the mouse 910.

Referring to FIG. 10, a user of a GUI control apparatus may input an input signal to control a GUI by moving a left hand 1020 and a right hand 1030 of the user within a sensing area. The sensing area may be located in a side of a keyboard 1010 including a sensing module.

The GUI control apparatus may receive, from the keyboard 1010, movement information regarding hovering movements of the left hand 1020 and the right hand 1030 sensed by the sensing module. Additionally, the GUI control apparatus may generate GUI control information based on the received movement information, and may control the GUI based on the generated GUI control information.

In this instance, the movement information may include coordinates (x, y, z, rx, ry, rz) representing information on a position and rotation of the left hand 1020, and coordinates (x, y, z, rx, ry, rz) representing information on a position and rotation of the right hand 1030.

Figure 11:
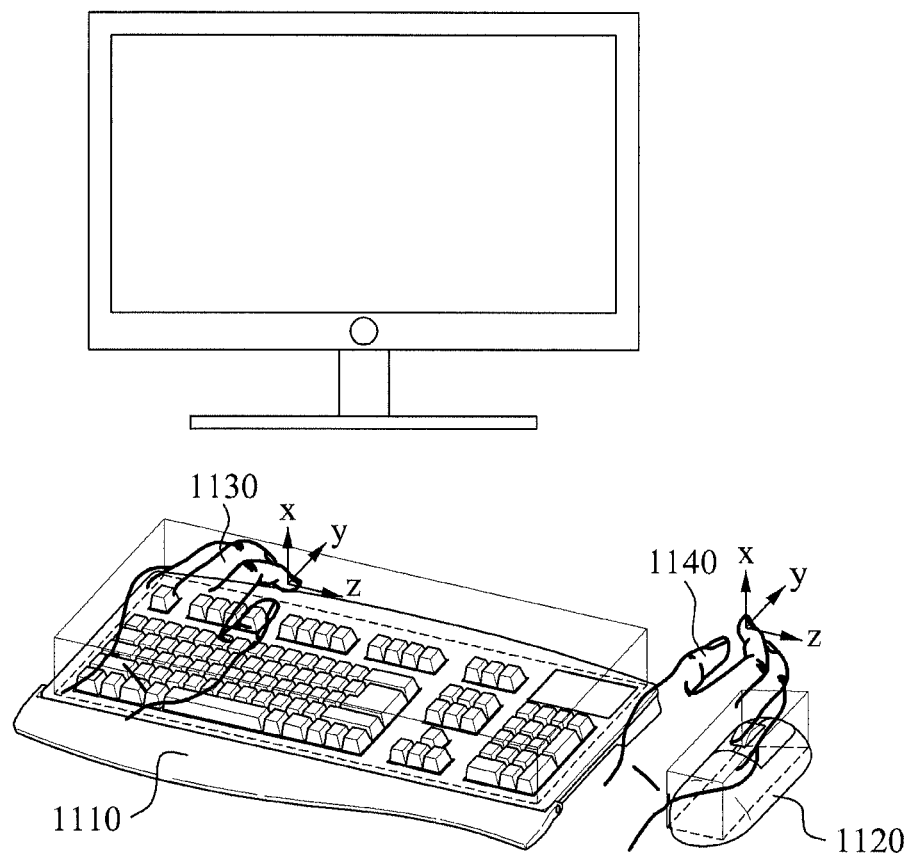

Referring to FIG. 11, a user of a GUI control apparatus may input an input signal to control a GUI by moving a left hand 1130 of the user within a sensing area located in a side of a keyboard 1110 including a sensing module, and by moving a right hand 1140 of the user within a sensing area located in a side of a mouse 1120 including a sensing module.

The GUI control apparatus may receive, from the keyboard 1110 and the mouse 1120, movement information regarding a hovering movement of the left hand 1130 above the keyboard 1110 and regarding a hovering movement of the right hand 1140 above the mouse 1120. The hovering movements may be sensed by the sensing modules. Additionally, the GUI control apparatus may generate GUI control information based on the received movement information, and may control the GUI based on the generated GUI control information.

In this instance, the movement information may include coordinates (x, y, z, rx, ry, rz) representing information on a position and rotation of the left hand 1130 above the keyboard 1110, and coordinates (x, y, z, rx, ry, rz) representing information on a position and rotation of the right hand 1140 above the mouse 1120.

Figure 12:
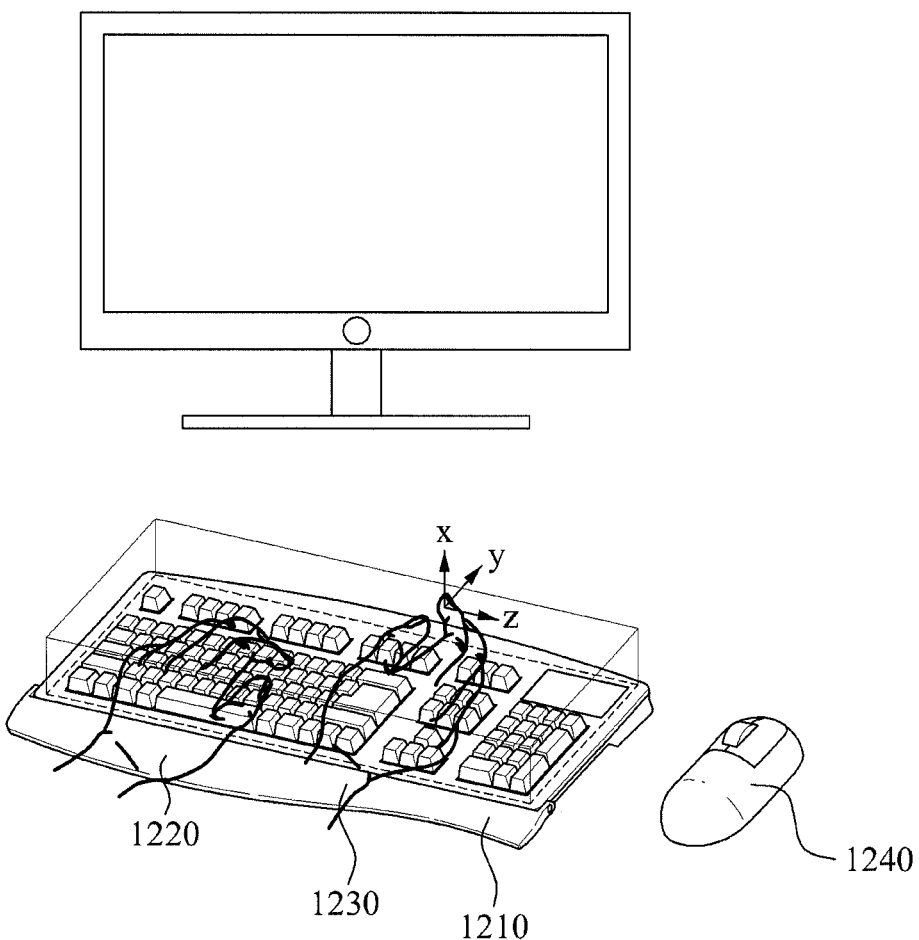

Referring to FIG. 12, a user of a GUI control apparatus may input an input signal to control a GUI by moving a right hand 1230 within a sensing area in a side of a keyboard 1210, and by operating keys on the keyboard 1210 with a left hand 1220. The keyboard 1210 may include a sensing module.

The GUI control apparatus may receive, from the keyboard 1210, movement information and input information. The movement information may be associated with a hovering movement of the right hand 1230 above the keyboard 1210, and the input information may be associated with the input signal inputted by operating the keys on the keyboard 1210 with the left hand 1220. The hovering movement may be sensed by the sensing module of the keyboard 1210. Additionally, the GUI control apparatus may generate GUI control information based on the received movement information and the received input information, and may control the GUI based on the generated GUI control information.

In this instance, the movement information may include coordinates (x, y, z, rx, ry, rz) representing information on a position and rotation of the right hand 1230 above the keyboard 1210. Additionally, the input signal may include information regarding a key-scan code of the keys on the keyboard 1210 operated with the left hand 1220.

Figure 13:
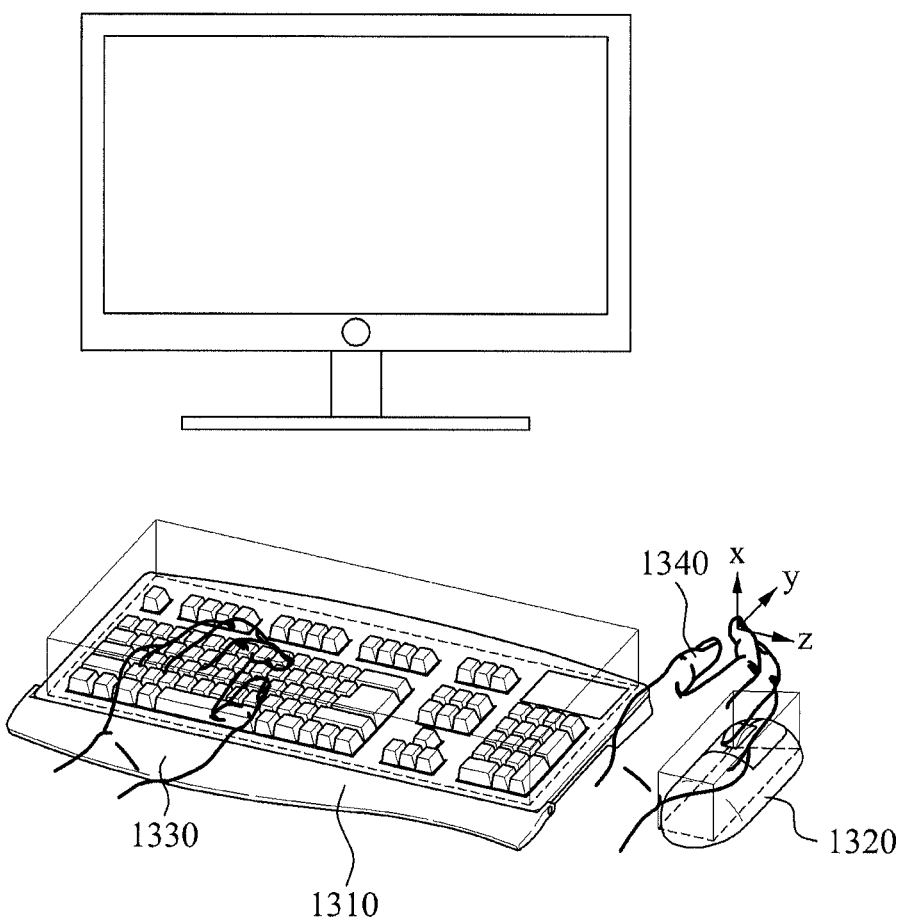

Referring to FIG. 13 a user of a GUI control apparatus may input an input signal to control a GUI by moving a right hand 1340 within a sensing area in a side of a mouse 1320, and by operating keys on a keyboard 1310 with a left hand 1330. The mouse 1320 may include a sensing module.

The GUI control apparatus may receive movement information from the mouse 1320, and may receive input information from the keyboard 1310. The movement information may be associated with a hovering movement of the right hand 1340 above the mouse 1320, and the input information may be associated with the input signal inputted by operating the keys on the keyboard 1310 with the left hand 1330. The hovering movement may be sensed by the sensing module of the mouse 1320. Additionally, the GUI control apparatus may generate GUI control information based on the received movement information and the received input information, and may control the GUI based on the generated GUI control information.

In this instance, the movement information may include coordinates (x, y, z, rx, ry, rz) representing information on a position and rotation of the right hand 1340 above the mouse 1320. Additionally, the input signal may include information regarding a key-scan code of the keys on the keyboard 1310 operated with the left hand 1330.

Figure 14:
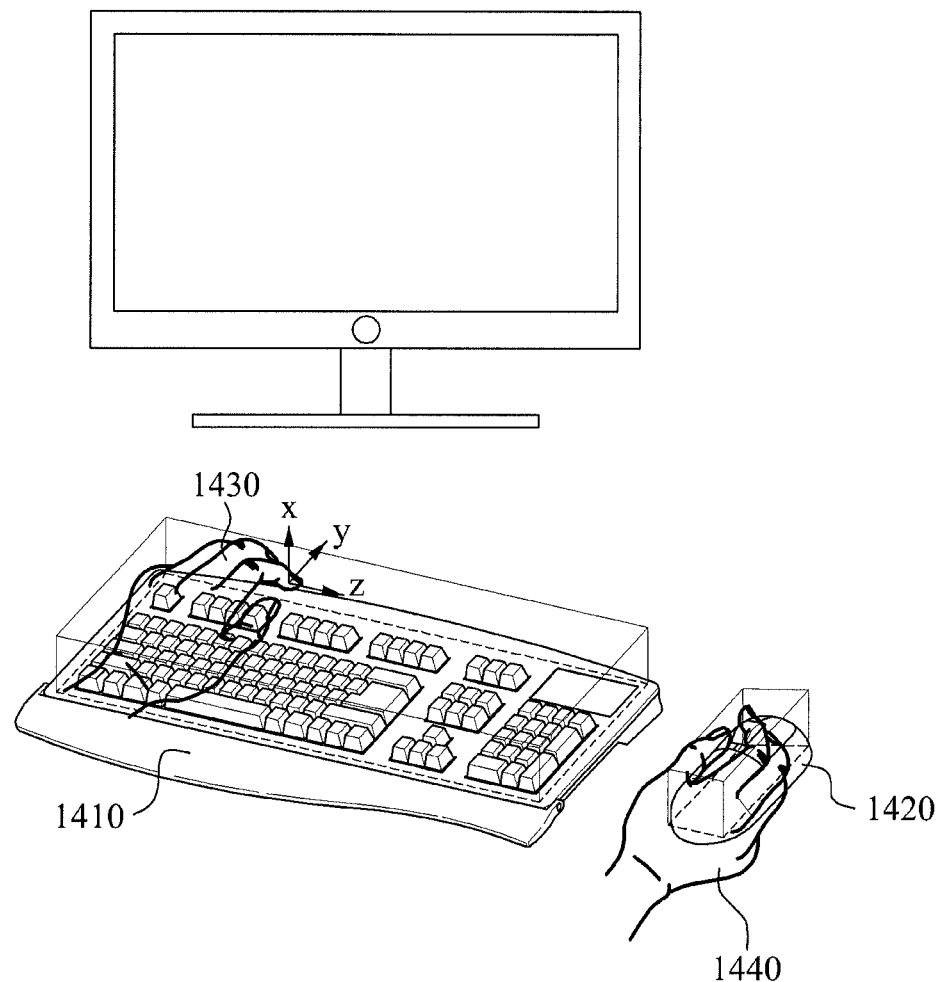

Referring to FIG. 14, a user of a GUI control apparatus may input an input signal to control a GUI by moving a left hand 1430 within a sensing area in a side of a keyboard 1410, and by operating a mouse 1420 with a right hand 1440. The keyboard 1410 may include a sensing module.

To input the input signal, the user may operate buttons on the mouse 1420 or a wheel on the mouse 1420, or may move the mouse 1420.

The GUI control apparatus may receive movement information from the keyboard 1410, and may receive input information from the mouse 1420. The movement information may be associated with a hovering movement of the left hand 1430 above the keyboard 1410, and the input information may be associated with the input signal inputted by operating the mouse 1420 with the right hand 1440. The hovering movement may be sensed by the sensing module of the keyboard 1410. Additionally, the GUI control apparatus may generate GUI control information based on the received movement information and the received input information, and may control the GUI based on the generated GUI control information.

In this instance, the movement information may include coordinates (x, y, z, rx, ry, rz) representing information on a position and rotation of the left hand 1430 above the keyboard 1410. Additionally, the input signal may include information regarding coordinates (x, y) representing a position of the mouse 1420 operated with the right hand 1440, a wheel value 'w' of the mouse 1420, and a key-scan code of the buttons on the mouse 1420.

Figure 15:
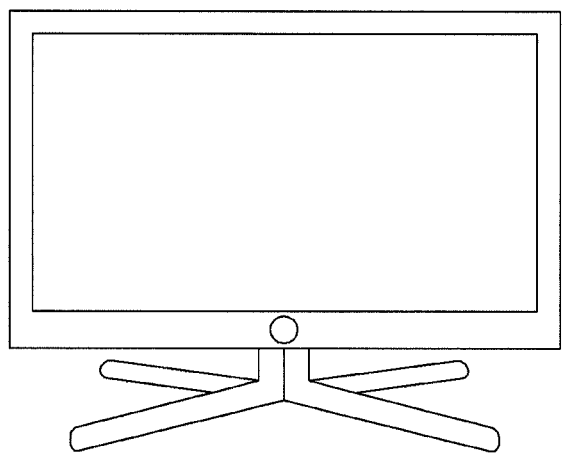
Figure 15:
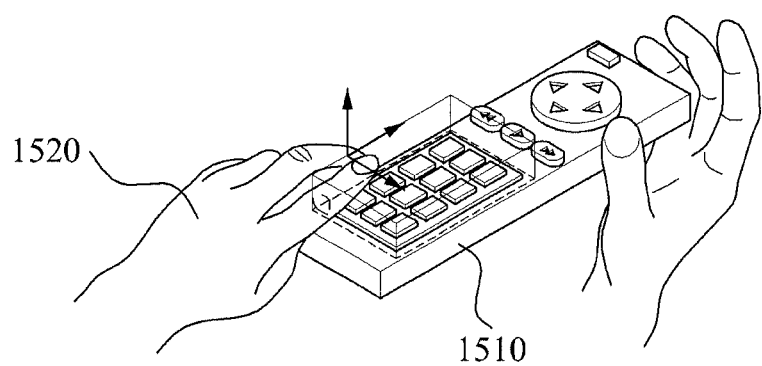

Referring to FIG. 15, a user of a GUI control apparatus may input an input signal to control a GUI by moving a hand 1520 within a sensing area in a side of a remote controller 1510, or by operating keys on the remote controller 1510. The remote controller 1510 may include a sensing module.

The GUI control apparatus may receive movement information or input information from the remote controller 1510. The movement information may be associated with a hovering movement of the hand 1520 above the remote controller 1510, and the input information may be associated with the input signal inputted by operating the keys on the remote controller 1510. The hovering movement may be sensed by the sensing module of the remote controller 1510. Additionally, the GUI control apparatus may generate GUI control information based on the received movement information or the received input information, and may control the GUI based on the generated GUI control information.

In this instance, the movement information may include coordinates (x, y, z, rx, ry, rz) representing information on a position and rotation of the hand 1520 above the remote controller 1510. Additionally, the input signal may include information regarding a key-scan code of the keys on the remote controller 1510 operated by the user.

Table 1 shows examples of controlling a GUI based on sensing data including movement information and input information, when a user inputs a GUI control signal using at least one of a keyboard and a mouse, as described above with reference to FIGS. 8 through 15. Since Table 1 is merely an example embodiment, there is no limitation thereto.

TABLE 1

| Interaction method | Sensing data | GUI |
|---|---|---|
| One hand 3D hovering for keyboard | Hand information (x, y, z, rx, ry, rz) | 1) Controls position and rotation of camera based on position and direction of single hand |
| One hand 3D hovering for mouse | Hand information (x, y, z, rx, ry, rz) | 2) Controls position and rotation of object based on position and direction of single hand |
| | | 3) Available to switch scenes, move object bundle, and perform 3D scrolling, when slap left/right/up/down/push/pull are recognized as gestures |
| | | 4) UI appears (displays) when approaching keyboard or mouse |

TABLE 1-continued

| Interaction method | Sensing data | GUI |
|---|---|---|
| | | 5) UI context is changed when hand approaches corresponding position for each block of keyboard |
| Two hands 3D hovering for keyboard | Left hand information (x, y, z, rx, ry, rz) Right hand information (x, y, z, rx, ry, rz) | 1) Controls position and rotation of camera based on positions and directions of both hands 2) Controls position and rotation of object based on positions and directions of both hands 3) Available to switch scenes, move object bundle, and perform 3D scrolling, when slap left/right/up/down/push/pull are recognized as gestures 4) UI appears when approaching keyboard or mouse 5) UI context is changed when hand approaches corresponding position for each block or keyboard |
| One hand 3D hovering for mouse & One hand 3D hovering over keyboard | Hand information (x, y, z, rx, ry, rz) | |
| One hand keying & One hand 3D hovering for keyboard | Key scan code Hand information (x, y, z, rx, ry, rz) | 1) Designates target group using keys, and manipulates object by hovering 2) Designates margin of screen using keys, and manipulates camera by hovering 3) Available to switch scenes, move object bundle, and perform 3D scrolling, when slap left/right/up/down/push/pull are recognized as gestures |
| One hand keying & One hand 3D hovering for mouse | Key scan code Hand information (x, y, z, rx, ry, rz) | For example, when 'a' is pressed using a keyboard, objects starting with the letter 'a' may appear, and browsing may be performed by hovering |
| One hand mousing for mouse & One hand 3D hovering for keyboard | Mouse position (x, y) Wheel value (w) Left, center, and right click Continuous position (x, y) Hand information (x, y, z, rx, ry, rz) | 1) Designates object group using mouse, and manipulates object by hovering 2) Designates margin of screen using mouse, and manipulates camera by hovering 3) Available to switch scenes, move object bundle, and perform 3D scrolling, when slap left/right/up/down/push/pull are recognized as gestures For example, an object bundle in space may be designed using mouse, and objects in the object bundle may be browsed by hovering. |

Figure 16:
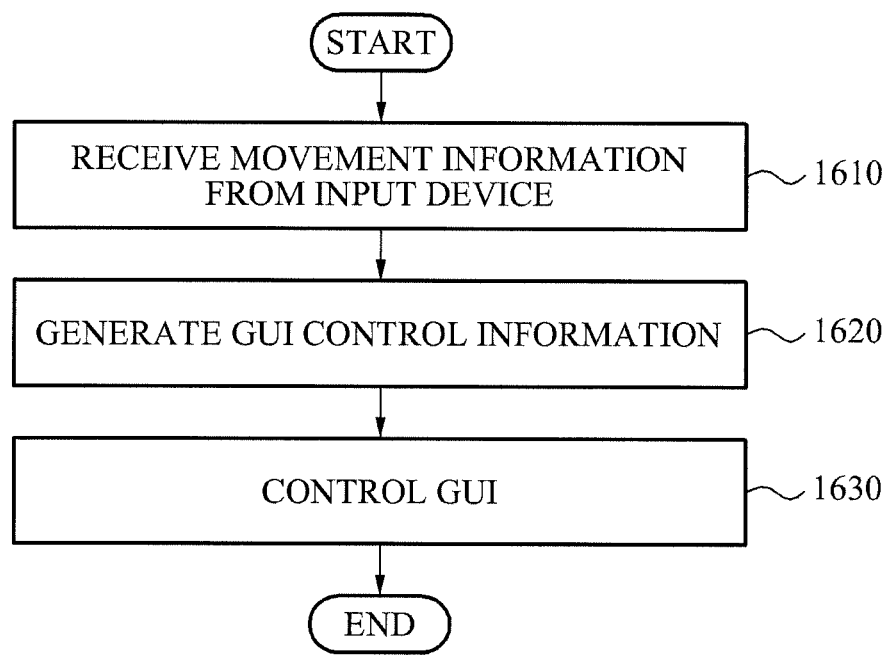
FIG. 16 illustrates a flowchart of a GUI control method according to example embodiments.

FIG. 16 illustrates a flowchart of a GUI control method according to example embodiments.

Referring to FIG. 16, in operation 1610, movement information may be received from an input device. The movement information may be associated with a hovering movement of a hand of a user within a sensing area located in a side of the input device.

The movement information may include at least one of information regarding a position of the hand, a size of the hand, a rotation of the hand, and a movement speed of the hand.

For example, the movement information may include 3D coordinates (x, y, z) representing the position of the hand within the sensing area, coordinates (rx, ry, rz) representing the rotation of the hand, and the like.

In operation 1620, GUI control information may be generated based on the movement information.

The GUI control information may be generated, based on a table in which types of movement of the hand are matched to meaningful control signals.

For example, when a hand of a user moves 5 cm in an x-axis direction, an action of moving an object in the same direction as the hand moves, and the like may be included in the table.

In operation 1630, a GUI may be controlled based on the GUI control information.

According to an aspect, a user may input an input signal by moving a hand of the user within a sensing area, or by operating keys or buttons on an input device.

In this instance, the input device may transmit, to a GUI control apparatus, input information inputted by the user operating the keys or buttons on the input device, in addition to the movement information.

Accordingly, in the GUI control method, the input information inputted to the input device by the user may be further received.

For example, when a keyboard or a mouse is used as an input device, input information may include at least one of information on keys on the keyboard entered by the user, information on buttons on the mouse entered by the user, information on a position of the mouse, and information on a wheel value of the mouse.

Additionally, GUI control information may be generated based on the input information, as well as the movement information.

The above-described example embodiments may be recorded in non-transitory computer-readable media including program instructions to implement various operations embodied by a computer. The media may also include, alone or in combination with the program instructions, data files, data structures, and the like. The program instructions recorded on the media may be those specially designed and constructed for the purposes of the example embodiments, or they may be of the kind well-known and available to those having skill in the computer software arts. Examples of non-transitory computer-readable media include magnetic media such as hard disks, floppy disks, and magnetic tape; optical media such as CD ROM disks and DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described example embodiments, or vice versa.

Although example embodiments have been shown and described, it would be appreciated by those skilled in the art that changes may be made in these example embodiments without departing from the principles and spirit of the disclosure, the scope of which is defined in the claims and their equivalents.

What is claimed is:

1. A sensing module configured to sense a hovering movement of a hand of a user within a sensing area disposed in a side of an input device, the sensing module comprising:
    mechanical keys;
    a light emitter configured to emit light;
    a light sensor configured to sense reflected light, and configured to collect movement information regarding the hovering movement of the hand;
    wherein a top side of the light emitter is disposed higher than a top side of the light sensor, in order to prevent the light sensor from directly sensing light emitted by the light emitter,
    wherein the reflected light is generated when the emitted light is reflected from the hand, and
    wherein the light emitter and the light sensor are disposed in a gap between mechanical keys.

2. The sensing module of claim 1, further comprising:
an additional light emitter, wherein the light emitters are inserted in predetermined locations in the side of the input device, and
an additional light sensor, wherein the light sensors are inserted in the predetermined locations.

3. The sensing module of claim 1, further comprising:
an additional light sensor, wherein the light sensors are inserted in predetermined locations in the side of the input device,
wherein the light emitter is configured to emit the light based on a Diffused Surface Illumination (DSI) scheme, and is inserted in the form of a wedge into the input device.

4. The sensing module of claim 1,
wherein the light emitter is configured to emit the light based on a DSI scheme, and is inserted in the form of a wedge into the input device, and
wherein the light sensor is inserted in the form of a wedge into the input device.

5. The sensing module of claim 1, further comprising: rubber domes, wherein each rubber dome is attached to a mechanical key.

6. The sensing module of claim 1, further comprising:
a first optical fiber configured to totally reflect the emitted light so that the emitted light travels outward from the side of the input device, wherein the first optical fiber has a first side connected to the light emitter and a second side exposed outside the input device; and
a second optical fiber configured to reflect the reflected light to the light sensor, wherein the second optical fiber has a first side connected to the light sensor and a second side exposed outside the input device.

7. The sensing module of claim 6, further comprising:
an additional first optical fiber, wherein the first optical fibers are exposed outside the input device in predetermined locations in the side of the input device, and
an additional second optical fiber, wherein the second optical fibers are exposed outside the input device in the predetermined locations.

8. An apparatus for controlling a Graphical User Interface (GUI), the apparatus comprising:
a receiver configured to receive, from an input device, movement information regarding a hovering movement of a hand of a user within a sensing area disposed in a side of the input device;
a generator configured to generate GUI control information based on the movement information; and
a controller configured to control a GUI based on the GUI control information,
wherein the movement information is collected by using a light emitter and a light sensor disposed in a gap between mechanical keys on the input device, and
wherein a to side of the light emitter is disposed higher than a top side of the light sensor, in order to prevent the light sensor from directly sensing light emitted by the light emitter.

9. The apparatus of claim 8,
wherein the input device comprises:
the light emitter configured to emit light, and
the light sensor configured to sense reflected light, and configured to collect the movement information; and
wherein the reflected light is generated when the emitted light is reflected from the hand.

10. The apparatus of claim 8,
wherein the movement information comprises at least one of: information regarding a position of the hand, a size of the hand, a rotation of the hand, and a movement speed of the hand.

11. The apparatus of claim 8,
wherein the input device further comprises rubber domes; and
wherein each rubber dome is attached to a mechanical key.

12. The apparatus of claim 8,
wherein the receiver is further configured to receive, from the input device, input information inputted to the input device by the user, and
wherein the generator is configured to generate the GUI control information, based on the input information and the movement information.

13. The apparatus of claim 12,
wherein the input device comprises at least one of: a keyboard and a mouse, and
wherein the input information comprises at least one of: information on keys on the keyboard entered by the user, information on buttons on the mouse entered by the user, information on a position of the mouse, and information on a wheel value of the mouse.

14. A method of controlling a Graphical User Interface (GUI) of a GUI control apparatus, the method comprising:
sensing at least one of position of a user's hand and direction of a user's hand, by using a light emitter and a light sensor disposed in a gap between mechanical keys on an input device;
controlling at least one of position of a camera, rotation of a camera, position of an object, and rotation of an object, based on the sensed position and direction of a single hand; and
switching scenes, moving the object, or scrolling 3D images when at least one of the following is detected: slap left, slap right, slap up, slap down, push, and pull,
wherein a to side of the light emitter is disposed higher than a top side of the light sensor, in order to prevent the light sensor from directly sensing light emitted by the light emitter.

15. The method of claim 14, the method further comprising:
displaying the GUI on a screen of the GUI control apparatus when a keyboard and/or a mouse detects approaching of user's hand to a predetermined distance from the keyboard and/or the mouse.

16. The method of claim 14, the method further comprising:
displaying at least one object starting with a letter when detecting approaching to a corresponding letter of a keyboard by the user's hand.

17. A method of controlling a Graphical User Interface (GUI), the method comprising:
receiving, from an input device, movement information regarding a hovering movement of a hand of a user within a sensing area disposed in a side of the input device;
generating GUI control information based on the movement information; and
controlling a GUI based on the GUI control information,
wherein the movement information is collected by using a light emitter and a light sensor disposed in a gap between mechanical keys on the input device, wherein a to side of the light emitter is disposed higher than a top side of the light sensor, in order to prevent the light sensor from directly sensing light emitted by the light emitter.

* * * * *